(12) United States Patent
Tanaka

(10) Patent No.: US 8,254,054 B2
(45) Date of Patent: Aug. 28, 2012

(54) LIBRARY APPARATUS

(75) Inventor: Kiyotaka Tanaka, Kato (JP)

(73) Assignee: Fujitsu Limited, Kawasaki (JP)

( * ) Notice: Subject to any disclaimer, the term of this patent is extended or adjusted under 35 U.S.C. 154(b) by 145 days.

(21) Appl. No.: 12/656,240

(22) Filed: Jan. 21, 2010

(65) Prior Publication Data

US 2010/0142090 A1 Jun. 10, 2010

Related U.S. Application Data

(63) Continuation of application No. PCT/JP2007/064777, filed on Jul. 27, 2007.

(51) Int. Cl.
*G11B 15/60* (2006.01)
*G11B 17/22* (2006.01)

(52) U.S. Cl. ...................... 360/92.1; 369/30.4

(58) Field of Classification Search .......... 360/92.1; 369/30.43, 30.45, 30.55, 30.57, 30.4
See application file for complete search history.

(56) References Cited

U.S. PATENT DOCUMENTS

| | | | |
|---|---|---|---|
| 5,297,122 A | 3/1994 | Christie | |
| 6,717,766 B2 * | 4/2004 | Hashimoto et al. | 360/92.1 |
| 6,826,004 B2 * | 11/2004 | Albrecht et al. | 360/69 |
| 7,111,781 B2 * | 9/2006 | Fletcher | 235/385 |
| 7,710,684 B2 * | 5/2010 | Hashimoto | 360/92.1 |
| 7,810,732 B2 * | 10/2010 | Kawasaki | 235/462.43 |
| 2007/0165321 A1 * | 7/2007 | Hashimoto | 360/69 |

FOREIGN PATENT DOCUMENTS

| | | |
|---|---|---|
| JP | 64-60502 | 3/1989 |
| JP | 4-75810 | 7/1992 |
| JP | 06-208726 | 7/1994 |
| JP | 10-162461 | 6/1998 |
| JP | 2005-141867 | 6/2005 |
| JP | 2007-15780 | 1/2007 |

OTHER PUBLICATIONS

Partial English translation of JP 10-162461 A to Fukuda, published on Jun. 19, 1998.*
English Translation of the International Preliminary Report on Patentability mailed Feb. 18, 2010 in corresponding International Patent Application PCT/JP2007/064777.
International Search Report for PCT/JP2007/064777, mailed Oct. 9, 2007.

* cited by examiner

*Primary Examiner* — Will J Klimowicz
(74) *Attorney, Agent, or Firm* — Staas & Halsey LLP

(57) ABSTRACT

A library apparatus includes: a housing, a record medium storage shelf that stores information record media having a barcode for identification; an input-output device in which the information record medium is loaded and which inputs and outputs information to and from the loaded information record medium; a robot that transfers the information record medium between the record medium storage shelf and the input-output device; and a controller that controls operation of the robot; a read unit that is detachably attached to the robot and reads the barcode of the information record medium; and a read unit storage that stores the read unit detached from the robot.

6 Claims, 10 Drawing Sheets

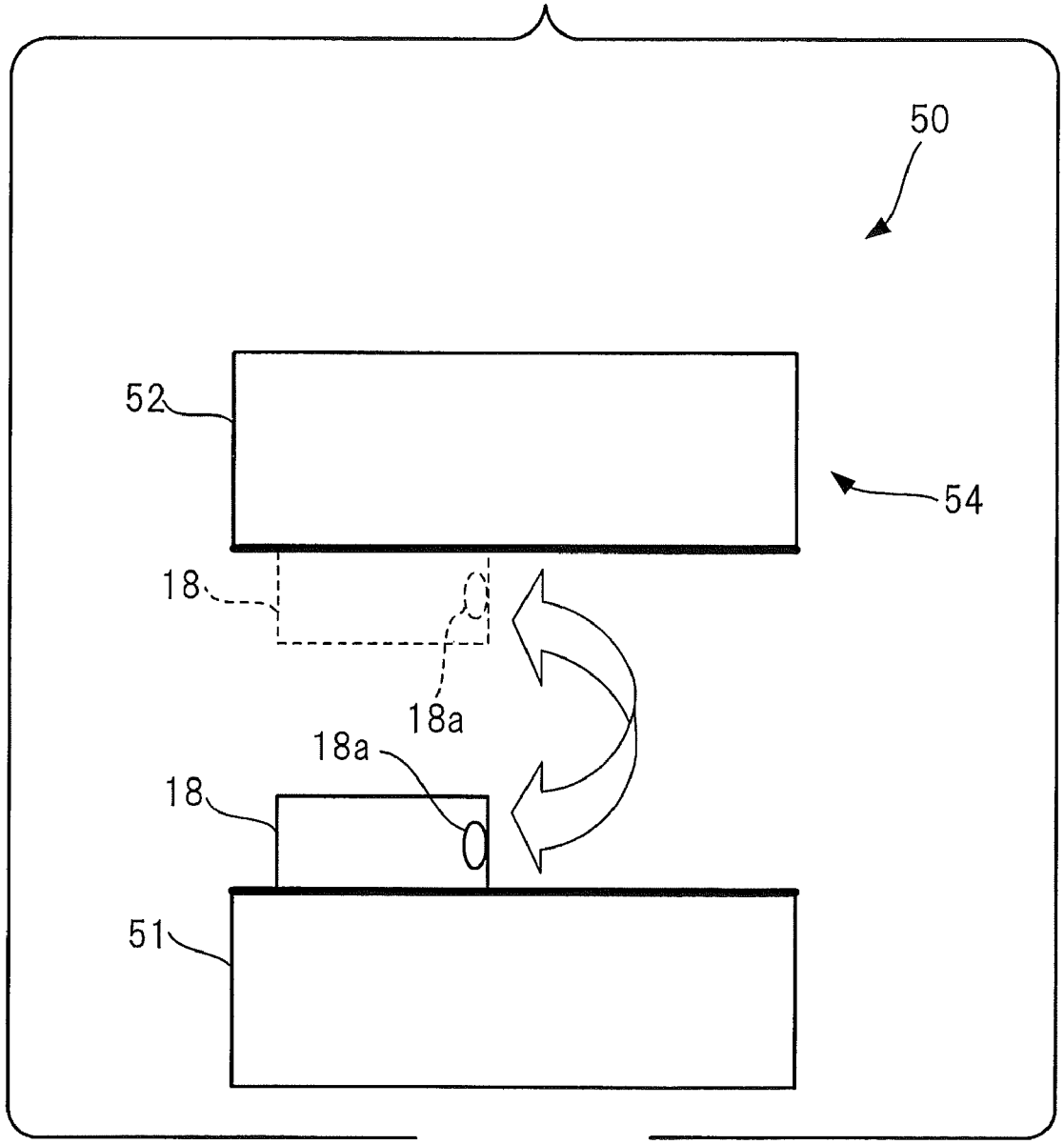

LIBRARY APPARATUS

CROSS-REFERENCE TO RELATED APPLICATION

This is a continuation application of, and claims priority under 35 U.S.C. §120 to PCT/JP2007/064777, filed on Jul. 27, 2007.

FIELD

The embodiments discussed herein are related to a library apparatus which stores plural information record media such as magnetic tapes and which inputs and outputs information to or from those information record media.

BACKGROUND

There is known a library apparatus capable of storing plural information record media such as magnetic tapes in its housing and transferring those information record media to an information input-output device such as a magnetic tape drive by a robot to input and output information. A barcode for identification is put on an information record medium, and a barcode read device for reading the barcode is attached to the robot. The robot reads a barcode of an information record medium placed at an information record medium transfer in-and-out opening, transfers and stores the information record medium. As a barcode read device, an optical barcode read device that uses an imaging element such as CCD (Charge Coupled Device) is widely used.

In a housing of the library apparatus, there are provided some fans for radiating heat, which are driven at power-on. This driving of fans generates an air flow in the housing, and sometimes results in entering of a dust outside the device into the housing. There is also dust floating in the housing, produced by a friction between an information record medium and a storage shelf. When the dust attaches to a CCD lens of the barcode read device and makes the CCD lens dirty and dusty, a read error in which a barcode may not be read correctly may probably occur.

If this read error occurs, a maintenance person is notified of and a cleaning operation of the CCD lens is performed by the maintenance person. However, until the cleaning operation is finished, the operation of the library apparatus is suspended.

Conventionally, for example, in the field of magneto-optical disc driving device, there is disclosed a method of preventing a lens from becoming dirty and dusty (see Japanese Laid-open Patent Application No. 06-208726, for example). In the method, a dust-proof cover is disposed to prevent a light-pickup lens from becoming dirty and dusty, in such a manner that the dust-proof cover is in a shield position where the dust-proof cover covers the lens when a cartridge incorporating a disc is not loaded in the device, whereas when the cartridge is loaded in the device, the dust-proof cover is pushed by the disc cartridge and moved to a waiting position, and returns to the original shield position when the cartridge is unloaded from the device.

In the magneto-optical disc driving device of the above-described Japanese Laid-open Patent Application No. 06-208726, it is possible to prevent a lens from becoming dirty and dusty by this simple method that a position of the dust-proof cover is changed according to whether a cartridge is loaded or unloaded in and from the device. However, it is difficult to apply this method to the above-described library apparatus. That is, when an information record medium is transferred to the library apparatus, the robot is required to move to the medium transfer in-and-out opening where the information record medium is placed and to read a barcode of the information record medium. However, if the method of preventing a lens from becoming dirty and dusty by a dust proof cover as in the above-described Japanese Laid-open Patent Application No. 06-208726 is applied, firstly, the dust proof cover needs to be moved from a shield position to a waiting position to read the barcode, and after having read the barcode, the dust proof cover needs to be returned to the original shield position. However, since an operation to move the dust proof cover to the waiting position and operation to return the dust proof cover to the original shield position are irrelevant to a relative position change between the information record medium and the robot, it is impossible to prevent a lens from becoming dirty and dusty with such simple mechanism as in the above-described Japanese Laid-open Patent Application No. 06-208726.

SUMMARY

According to an aspect of the invention, a first library apparatus includes:

a housing;

a record medium storage shelf that is disposed in the housing and stores plural information record media;

an input-output device in which the information record medium is loaded and which inputs and outputs information to and from the loaded information record medium;

a robot that transfers the information record medium between the record medium storage shelf and the input-output device; and a controller that controls operation of the robot, wherein the record medium storage shelf, the input-output device, the robot and the controller are arranged in the housing, the information record medium includes a barcode for identification, the library apparatus further comprises:

a read unit that is detachably attached to the robot and reads the barcode of the information record medium; and a read unit storage that stores the read unit detached from the robot, and the controller controls the robot such that when the controller causes the robot to read the barcode of the information record medium, the controller causes the robot to receive the read unit stored in the read unit storage and after reading the barcode by the read unit, the controller causes the robot to return the read unit to the read unit storage.

According to another aspect of the invention, a second library apparatus includes:

a housing;

a record medium storage shelf that is disposed in the housing and stores plural information record media;

an input-output device in which the information record medium is loaded and which inputs and outputs information to and from the loaded information record medium;

a robot in operation that transfers the information record medium between the record medium storage shelf and the input-output device; and a robot on standby that stands by at a predetermined standby position as a reserve of the robot in operation which is in an operation state, wherein the record medium storage shelf, the input-output device, the robot in operation, and the robot on standby are arranged in the housing, the information record medium includes a barcode for identification, the library apparatus further comprises:

a read unit which is detachably attached to either one of the robot in operation and the robot on standby and which reads a barcode put on the information record medium, the robot on standby stands by at the predetermined standby position in a state of receiving the read unit from the robot in operation while the robot in operation is in the operation state, and the robot in operation receives the read unit from the robot on standby when reading the barcode of the information record medium and returns the read unit to the robot on standby after reading the barcode.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 is a drawing illustrating passing operation of a read unit in the library apparatus in the second embodiment.

DESCRIPTION OF EMBODIMENTS

Hereinafter, an embodiment of the present invention will be described.

Figure 1A:
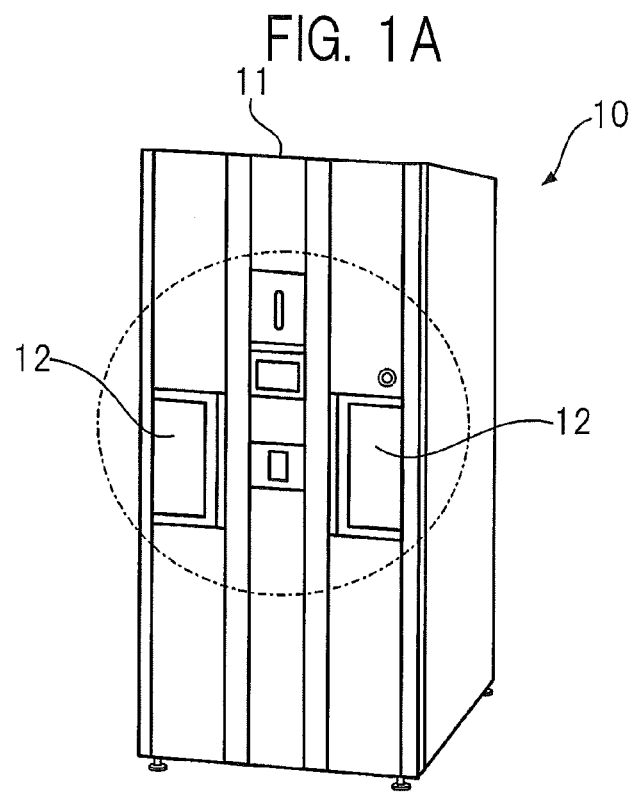
FIGS. 1A and 1B are external diagrams illustrating a first embodiment of a library apparatus according to the present invention.
Figure 1B:
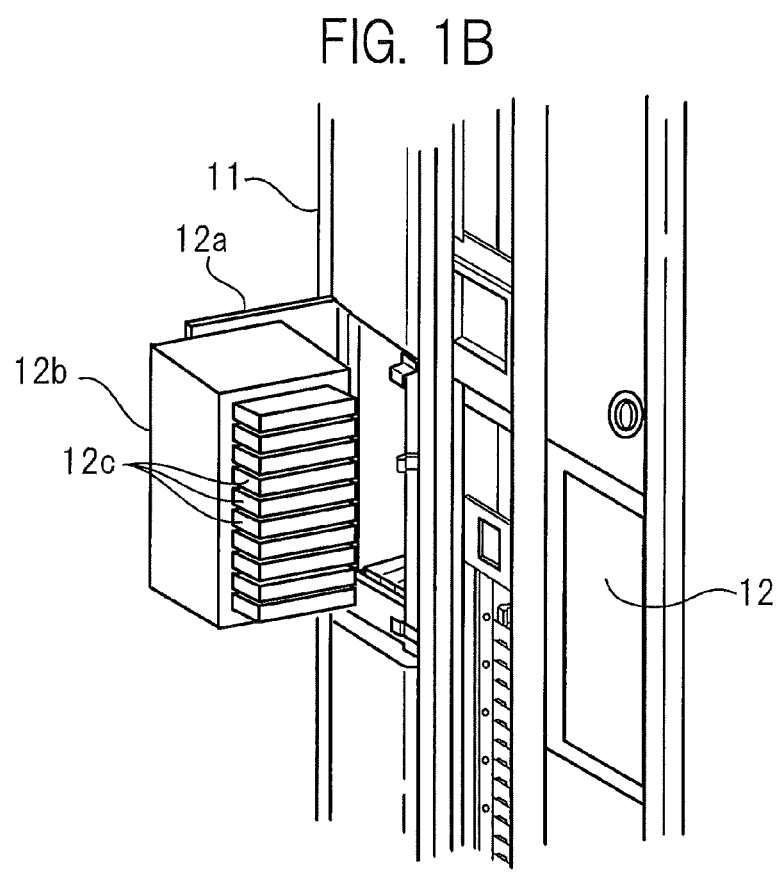

FIGS. 1A and 1B are external diagrams illustrating a first embodiment of a library apparatus according to the present invention.

A library apparatus 10 in the first embodiment is one example of the first library apparatus according to the present invention.

FIGS. 1A and 1B illustrate a housing 11 of the library apparatus 10 and a record medium in-and-out opening 12 through which a magnetic tape is carried in and out of the library apparatus 10. The record medium in-and-out openings 12 are provided at two places. In each of the record medium in-and-out openings 12, doors 12a that open outwardly are provided respectively, to enable carrying in and carrying out of a magnetic tape contained in a magazine 12b to and from the library apparatus 10 by opening the door 12a.

The magazine 12b may contain cassettes 12c in which a magnetic tape (not illustrated) is housed inside, up to 10 maximum, as illustrated in FIG. 1B.

In the following explanation, a magnetic tape that is housed in a cassette is simply referred to as a magnetic tape.

Figure 2:
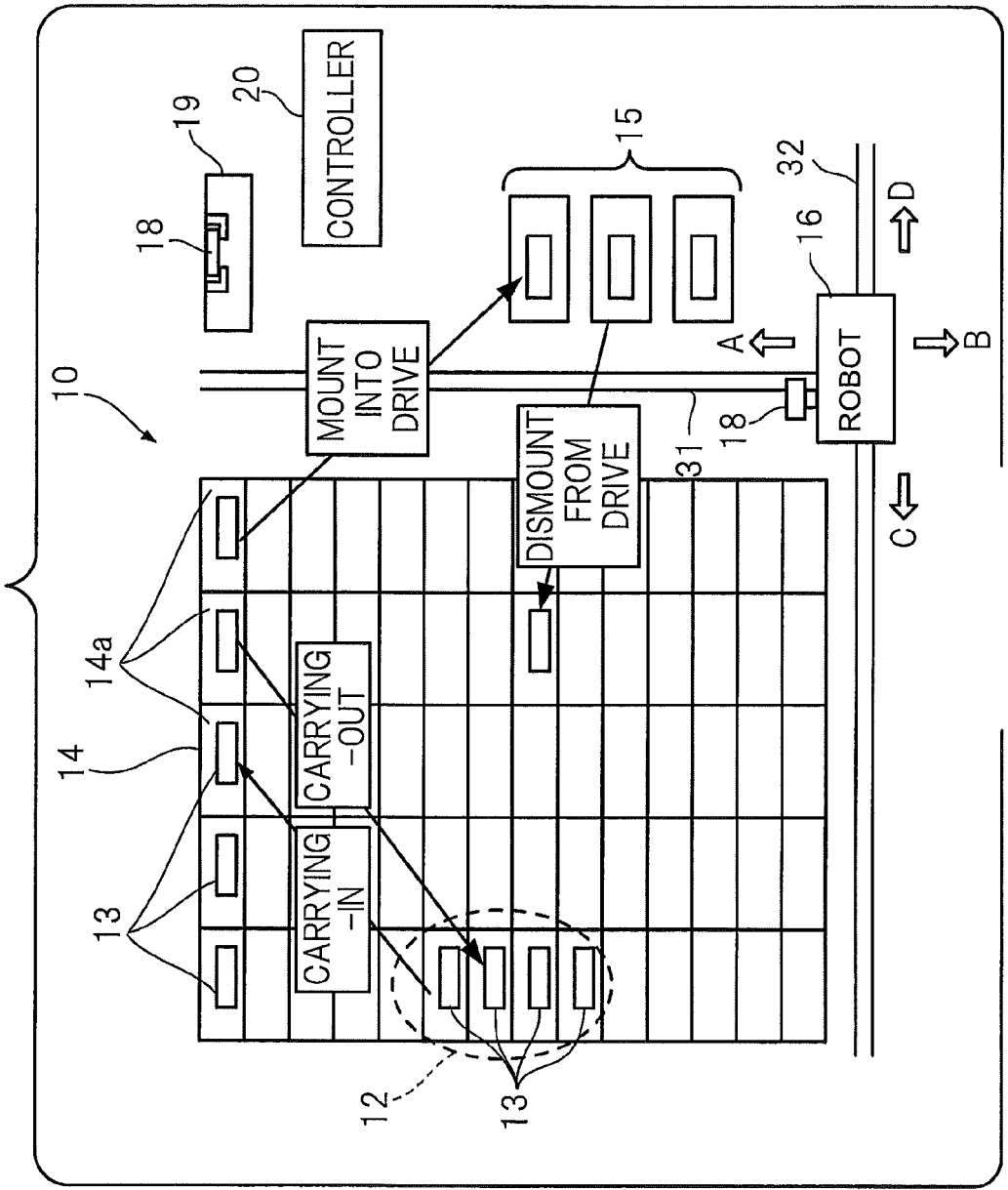
FIG. 2 is a schematic diagram illustrating an internal structure of the library apparatus in the first embodiment.

FIG. 2 is a schematic diagram illustrating an internal structure of the library apparatus of the first embodiment.

As illustrated in FIG. 2, the library apparatus 10 includes the record medium in-and-out opening 12 through which a magnetic tape 13 is carried in and out of the library apparatus 10; a record medium storage shelf 14 which stores plural magnetic tapes 13; a magnetic tape drive 15 in which the magnetic tape 13 is loaded and which inputs and outputs information to and from the loaded magnetic tape 13; a robot 16 which transfers the magnetic tape between the record medium in-and-out opening 12 and the record medium storage shelf 14, and between the record medium storage shelf 14 and the magnetic tape drive 15; a read unit 18 which reads a barcode attached to the magnetic tape 13 and which is detachably attached to the robot 16; a read unit storage 19 which stores the read unit 18 detached from the robot 16; and a controller 20 which controls operation of the robot 16. Although four magnetic tapes 13 are illustrated in the record medium in-and-out opening 12 in FIG. 2, the record medium in-and-out opening 12 may store a maximum number of 10 of the magnetic tapes 13.

Incidentally, the magnetic tape 13 in the present embodiment is one example of the information record medium according to the present invention, and the magnetic tape drive 15 in the present embodiment is one example of the input-output device according to the present invention.

The robot 16 moves on rails 31, 32 in directions of A, B, C, and D, based on a control by the controller 20 and transfers the magnetic tape between the record medium in-and-out opening 12 and the record medium storage shelf 14, and between the record medium storage shelf 14 and the magnetic tape drive 15.

The record medium storage shelf 14 contains plural cells 14a into which the magnetic tapes 13 are stored and each cell has a specific cell number.

A barcode label (not illustrated) on which a barcode for identifying each magnetic tape is printed is attached to the magnetic tape 13. The barcode is read by the read unit 18 that is attached to the robot 16 when the magnetic tape to be newly carried in the library apparatus 10 is placed at the record medium in-and-out opening 12, and is used as information for storing the magnetic tape to a predetermined cell of the record medium storage shelf 14, based on a control signal from the controller 20.

The controller 20 controls the robot 16 such that the controller 20 causes the robot 16 to receive the read unit 18 stored in the read unit storage 19 when the controller 20 causes the robot 16 to read a barcode of the magnetic tape being at the record medium in-and-out opening 12, and after the barcode is read by the read unit 18, the controller 20 causes the robot 16 to return the read unit 18 to the read unit storage 19.

Figure 3A:
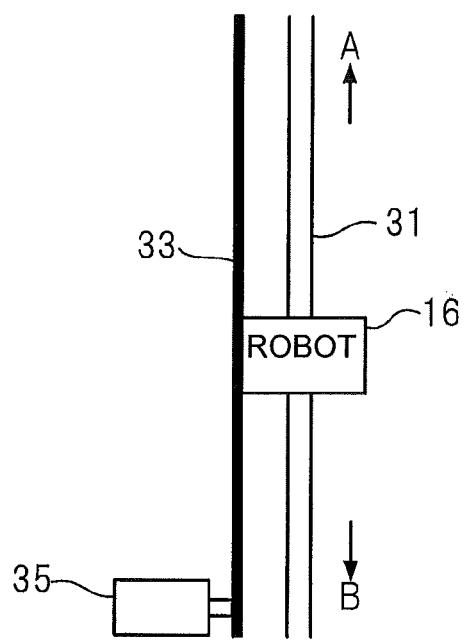
FIG. 3A is a side view illustrating a drive mechanism of a robot of the first embodiment and FIG. 3B is a top view thereof.
Figure 3B:
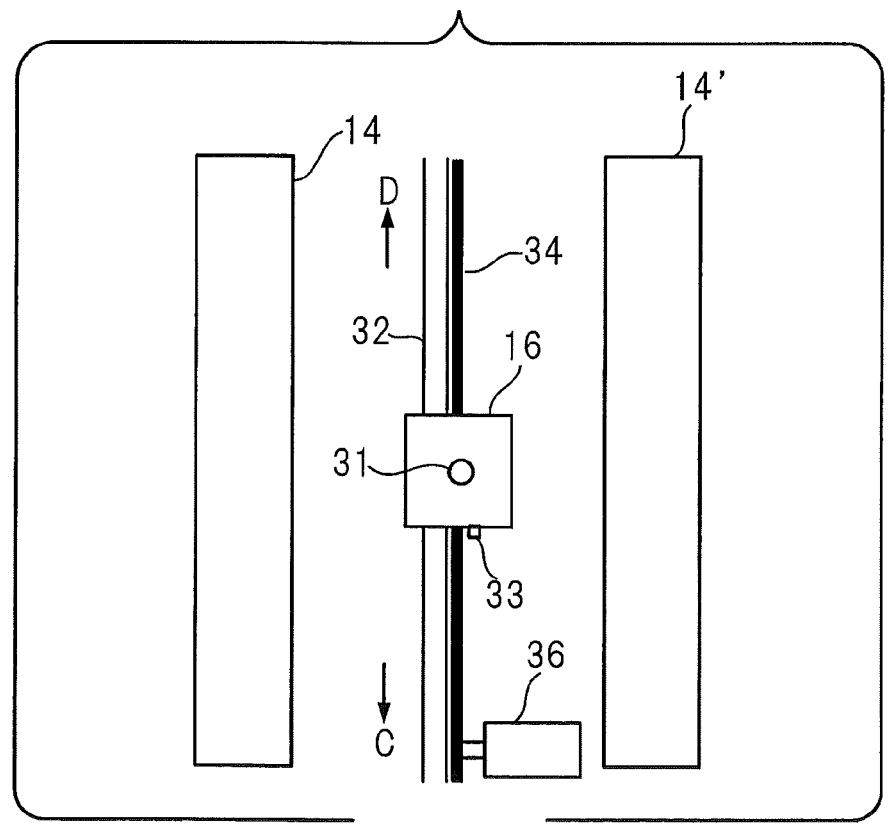

FIG. 3A is a side view illustrating a drive mechanism of the robot in the first embodiment and FIG. 3B is a top view thereof.

In the library apparatus of the present embodiment, as illustrated in FIG. 3B, the record medium storage shelves 14, 14' are disposed in two rows with the robot 16 interposed therebetween. The robot 16 is allowed to access the magnetic tape stored in a cell of the record medium storage shelf on a desired side of the record medium storages shelves 14, 14' that are arranged in two rows on both sides of the robot 16.

As illustrated in FIG. 3A, the robot 16 is supported to be slidable on the rail 31 that extends in a vertical direction (arrows A, B), and the robot 16 moves in the vertical direction by a timing belt 33 that circulates in the vertical direction and a servo motor 35 that drives the timing belt 33.

As illustrated in FIG. 3B, the rail 31 that slidably supports the robot 16 is supported to be slidable on the rail 32 that extends in a depth direction (arrows C, D), and moves in the depth direction by a timing belt 34 that circulates in the depth direction and a servo motor 36 that drives the timing belt 34.

By the drive mechanism constructed like this, the robot 16 moves to a position of a cell 14a (see FIG. 2) designated from the controller 20, and accesses the magnetic tape stored in the cell (see FIG. 2).

Figure 4:
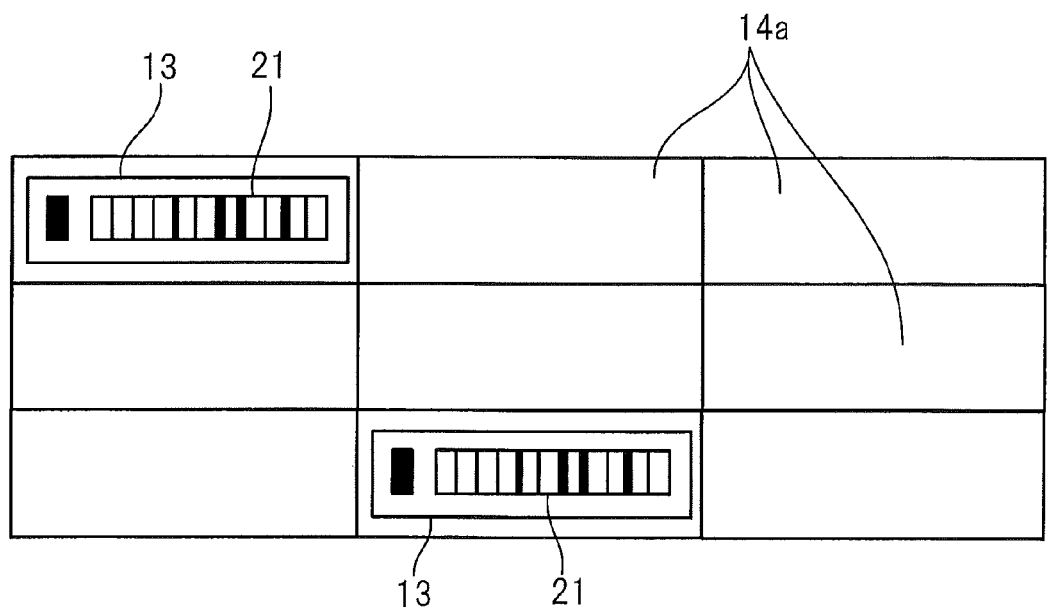
FIG. 4 is a drawing illustrating magnetic tapes stored in a record medium storage shelf in the first embodiment.

FIG. 4 is a drawing illustrating magnetic tapes stored in the record medium storage shelf in the first embodiment.

FIG. 4 illustrates the magnetic tapes 13 stored in the record medium storage shelf 14. A barcode 21 for identifying the magnetic tapes from each other is attached to each of the magnetic tapes 13.

The read unit 18 attached to the robot 16 (see FIG. 2) reads the barcode 21 of the magnetic tape at the record medium in-and-out opening 12 (see FIG. 1), and notifies it to the controller 20 (see FIG. 1). The controller 20 determines, based on the barcode, a cell number of the record medium storage shelf 14 to store the magnetic tape and notifies it to the robot 16. The robot 16 having received the notification transfers the magnetic tape to a cell 14a corresponding to the cell number and stores it therein.

Figure 5:
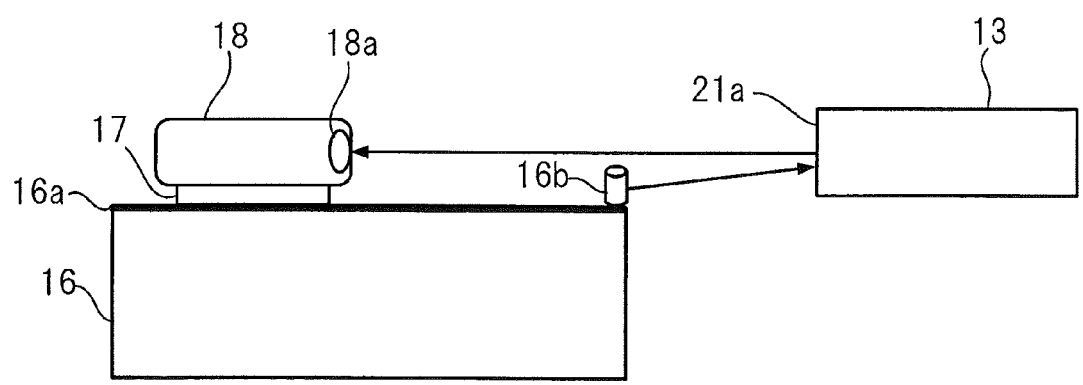
FIG. 5 is a drawing illustrating a relationship among the robot, a read unit, and the magnetic tape in the first embodiment.

FIG. 5 is a drawing illustrating a relationship among the robot, the read unit, and the magnetic tape in the first embodiment.

As illustrated in FIG. 5, a magnet 17 is attached to a print board 16a disposed on the robot 16 to draw the read unit 18 by magnetic force.

On the print board 16a of the robot 16, a LED (Light Emitting Diode) 16b is disposed and a CCD 18a is incorporated in the read unit 18. The LED 16b emits light toward the barcode 21 of the magnetic tape 13, and the CCD 18a reads the barcode 21 illuminated by the LED 16b.

Incidentally, the CCD 18a in the present embodiment is one example of the imaging element according to the present invention.

Figure 6:
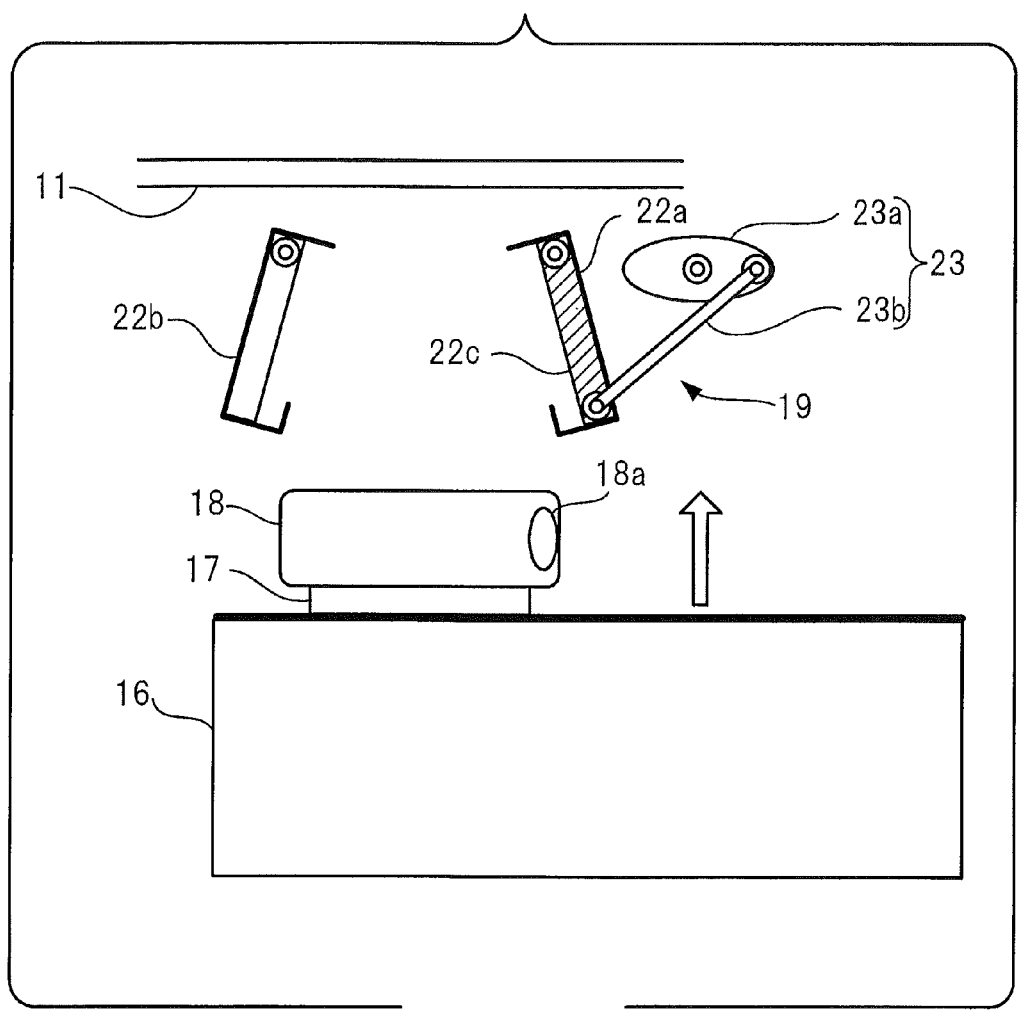
FIG. 6 is a drawing illustrating a state of a read unit storage in the first embodiment before storing a read unit.
Figure 7:
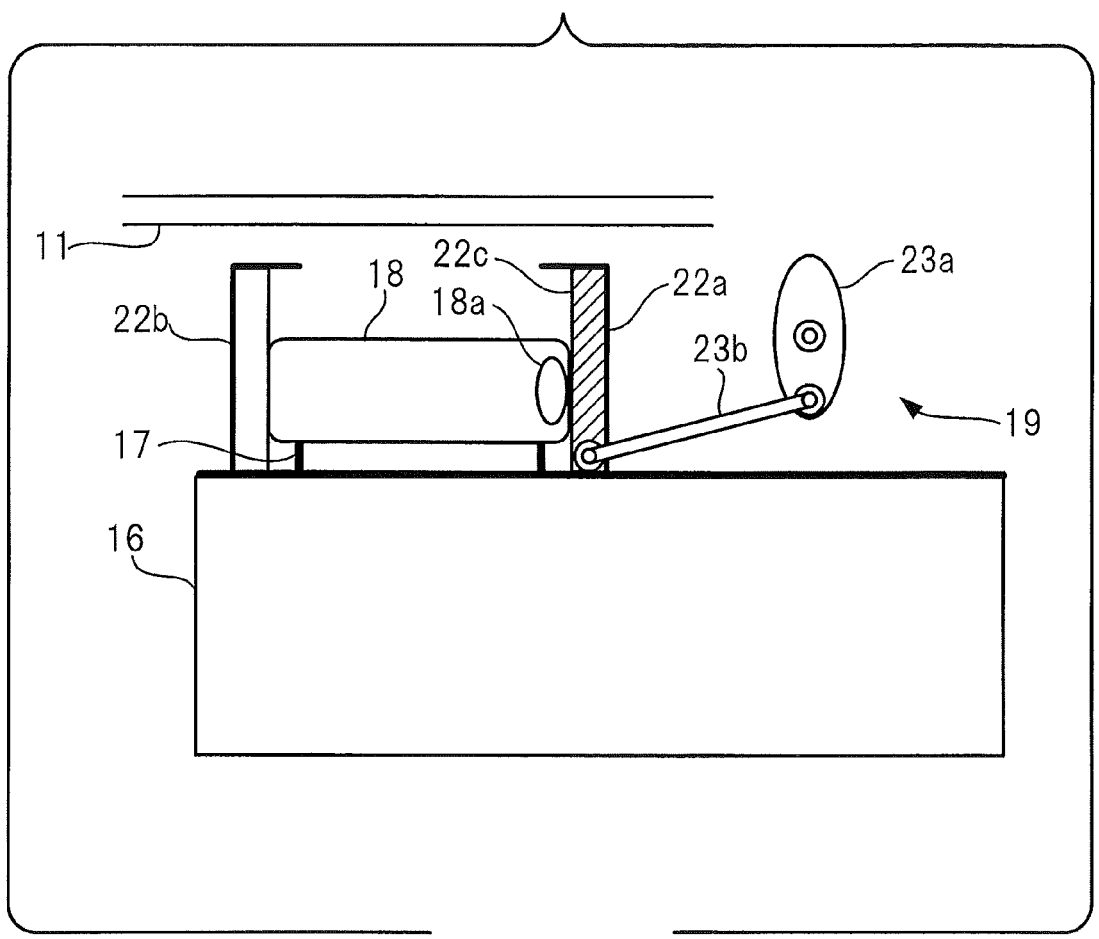
FIG. 7 is a drawing illustrating a state of the read unit storage in the first embodiment in the middle of storing the read unit.
Figure 8:
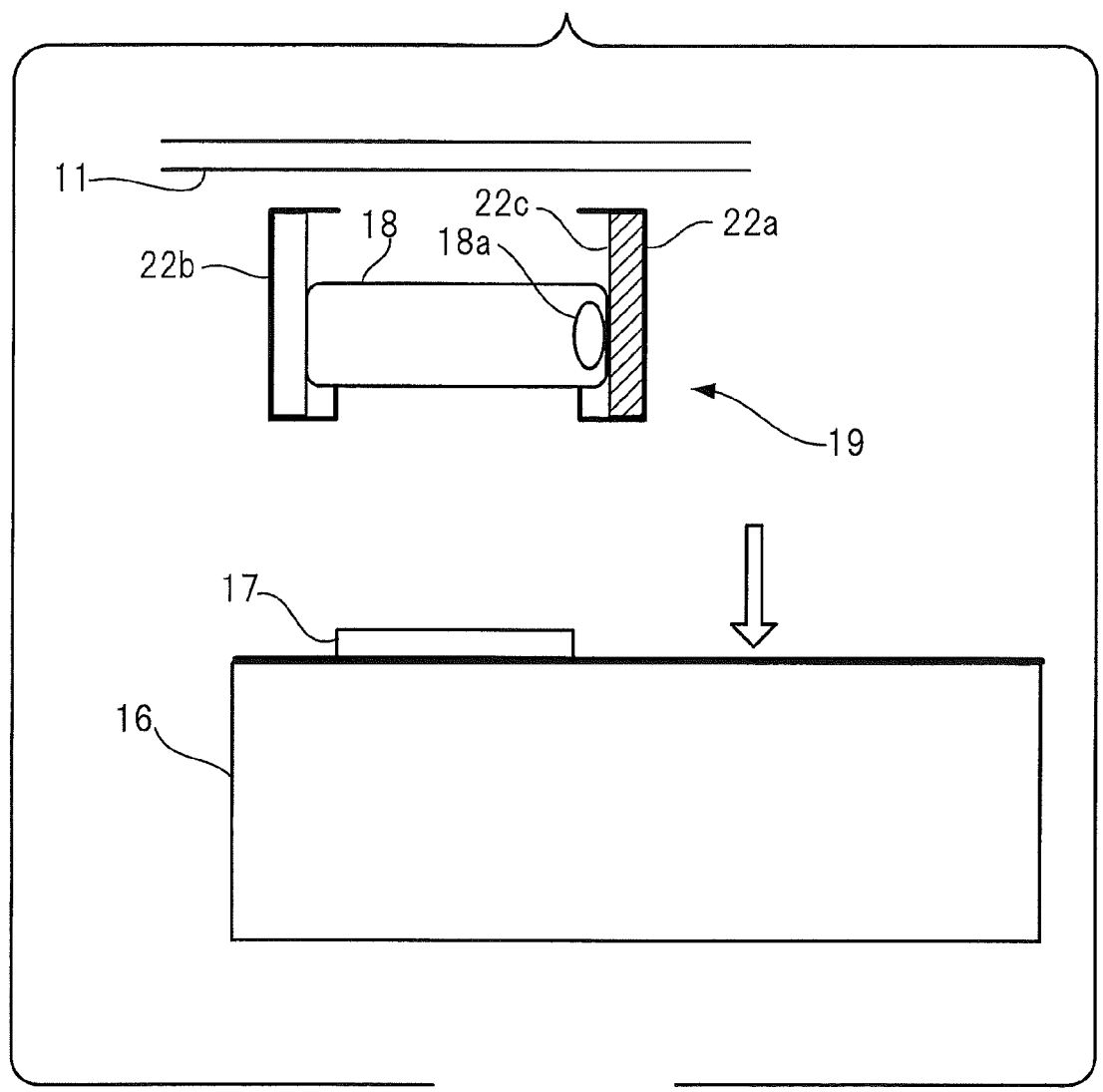
FIG. 8 is a drawing illustrating a state of the read unit storage in the first embodiment after having stored the read unit.

FIG. 6 is a drawing illustrating a state of the read unit storage in the first embodiment before storing the read unit. FIG. 7 is a drawing illustrating a state of the read unit storage in the first embodiment in the middle of storing the read unit, and FIG. 8 is a drawing illustrating a state of the read unit storage in the first embodiment after storing the read unit.

The read unit storage 19 serves as a storage of a read unit detached from the robot 16 and is attached to a part of the housing 11 of the library apparatus (see FIG. 1). The read unit storage 19 includes a pair of holding members 22a, 22b which sandwich and hold the read unit 18; and a read unit detaching device 23 including a cam 23a and a coupling rod 23b. The read unit detaching device 23 serves to change the pair of holding members 22a, 22b alternately in either a releasing posture in which the read unit 18 sandwiched between the pair of holding members is released by moving the pair of holding members in a direction of moving away from each other (see FIG. 6) or a holding posture in which the read unit 18 is sandwiched from both sides by the pair of holding members (see FIG. 7).

A seal member 22c is placed as a lining on a surface facing the CCD 18a, of the holding member 22a that is one of the pair of holding members and that is on a side facing the CCD 18a.

Next, by referring to FIGS. 6, 7, and 8, operation of each part will be explained until when the read unit 18 attached to the robot 16 is stored in the read unit storage 19.

When storing the read unit 18 in the read unit storage 19, based on a control signal from the controller 20, the read unit storage 19 changes the holding members 22a, 22b to the releasing posture in which the pair of holding members 22a, 22b is moved in the direction of moving away from each other (see FIG. 6).

The robot 16 approaches, from a direction indicated by an arrow, in-between the holding members 22a, 22b thus changed to the releasing posture. When the read unit 18 attached to the robot 16 enters in-between the holding members 22a, 22b and reaches a predetermined position, the holding members 22a, 22b change to the holding posture in which the holding members 22a, 22b sandwich and hold the read unit 18 from both sides by the operation of the cam 23a and the coupling rod 23b (see FIG. 7).

Subsequently, as illustrated in FIG. 8, when the robot 16 moves away from the read unit storage 19 in the direction indicated by an arrow, the draw of the read unit 18 with the robot 16 by the magnetic force is released, the read unit 18 is separated from the robot 16 and remains in the read unit storage 19 in the state of being sandwiched from both sides by the holding members 22a, 22b.

In this way, as illustrated in FIG. 8, the read unit 18 is held by the holding members 22a, 22b of the read unit detaching device 23. At this time, by the seal member 22c of the holding member 22a, a front surface of the CCD 18a of the read unit 18 is covered, and thus the CCD 18a is guarded from dust.

Next, operation of the robot 16 when the robot 16 receives the read unit 18 held in the read unit detaching device 23 will be explained.

When the robot 16 approaches the read unit 18 held in the read unit detaching device 23 (see FIG. 8) in a direction opposite to the direction of the arrow, and the magnet 17 of the robot 16 contacts the read unit 18, the read unit 18 is drawn to the robot 16 by the magnetic force. Here, by a control signal from the controller 20 (see FIG. 2), the read unit detaching device 23 causes the holding members 22a, 22b to change to the releasing posture (see FIG. 6), the read unit 18 is drawn to the robot 16 by the magnet 17 and the robot 16 moves away in the direction opposite to the direction of the arrow while still holding the read unit 18.

With the above-described structure, in the library apparatus 10, the read unit 18 is attached to the robot 16 only at a time when reading the barcode of a magnetic tape at the record medium in-and-out opening 12 (see FIG. 2), whereas the read unit 18 is stored in the read unit storage 19 at all other times. As such, a duration of time in which the read unit 18 is exposed to a dust is shortened, thereby reducing an error occurrence ratio of reading. Consequently, maintenance cost is reduced while increasing the operability, and thus the library apparatus 10 that is of low-cost and highly reliable is obtained.

Incidentally, in the first embodiment, as described above, since the read unit 18 is configured such that the read unit 18 is detachably attached to the robot 16, an accuracy of attaching the read unit 18 to the robot 16 may deviate each time it is attached. If deviation in the accuracy of attaching goes beyond a certain limit, the read unit 18 may not read the barcode 21 of the magnetic tape 13 correctly, causing a malfunction of the robot.

Accordingly, the library apparatus of the present embodiment is equipped with a reference barcode label for measuring an attach position of the read unit, as illustrated in the following.

Figure 9:
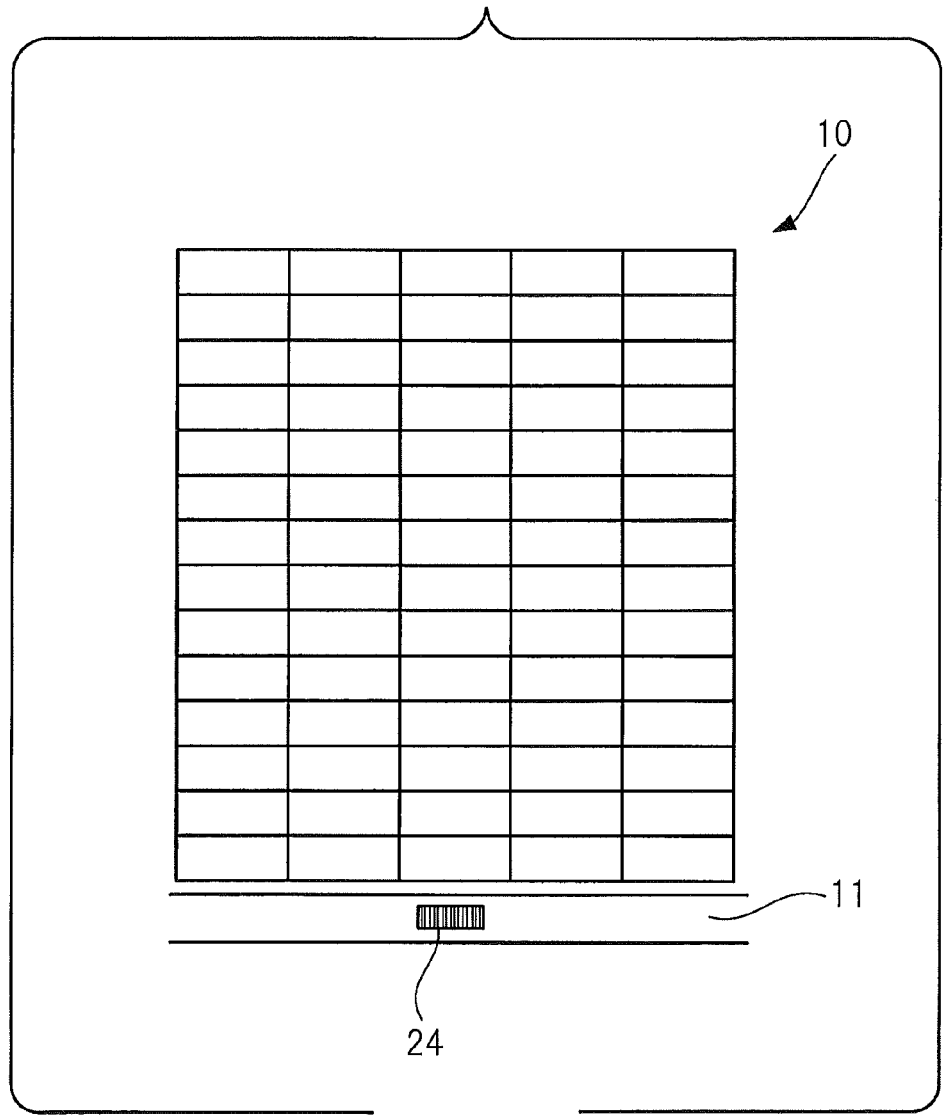
FIG. 9 illustrates a reference mark provided in the library apparatus in the first embodiment.

FIG. 9 illustrates a reference barcode label provided in the library apparatus in the first embodiment.

As illustrated in FIG. 9, in the library apparatus 10, a reference barcode label 24 for measuring an attach position of the read unit to the robot is put on the housing 11.

Incidentally, the reference barcode label 24 is one example of the reference mark according to the present invention. The reference mark according to the present invention is not limited to a barcode label, but may be any mark as long as an attach position of the read unit to the robot may be measured.

In the present embodiment, when the robot receives the read unit from the read unit storage, the controller 20 (see FIG. 2) recognizes an attach position of the read unit with respect to the robot by causing the read unit to read the reference barcode label 24. The controller 20 stores a previous recognition result, detects a difference between a current recognition result and the previous recognition result and adjusts a read position of the read unit based on the difference.

As explained with reference to FIG. 3, the robot 16 is driven by the servo motors 35, 36, and it is possible to determine a position of the robot 16 in a required accuracy, irrelevant to the presence or absence of the read unit.

However, when the read unit received from the read unit storage is attached to the robot, if a dust attaches to an attach surface of either the robot side or the read unit side, or the attach surface is deformed for some reason, an attach position of the read unit to the robot may probably be deviated from the previous attach position.

Such deviation of the attach position makes it impossible for the read unit to accurately read a barcode attached to the magnetic tape. Therefore in the present embodiment, when the robot receives the read unit from the read unit storage, the read unit is caused to read the reference barcode label 24 so that an attach position of the read unit with respect to the robot is recognized.

Next, a second embodiment of the present invention will be explained.

Figure 10:
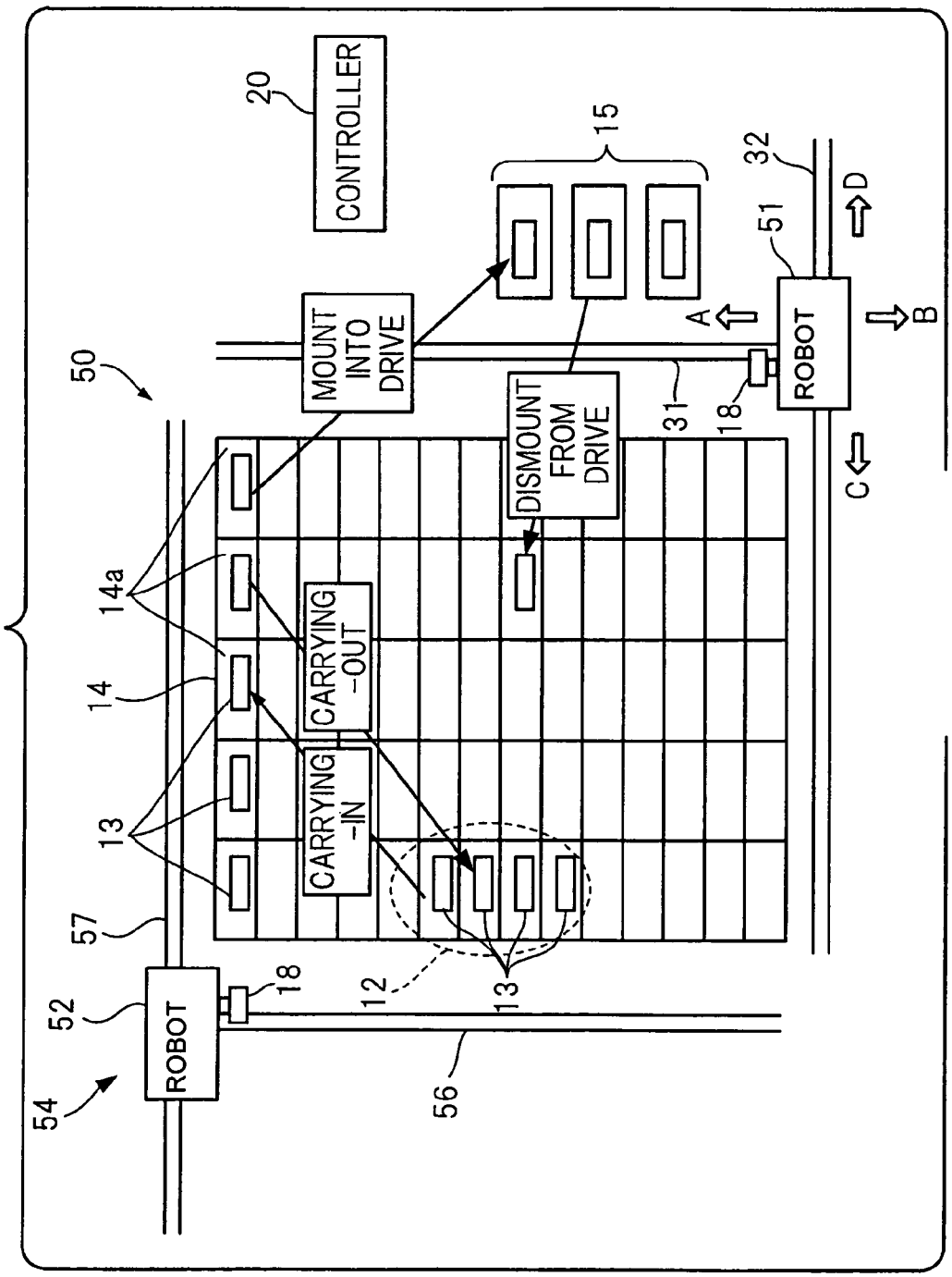
FIG. 10 is a schematic view illustrating an internal structure of a library apparatus in a second embodiment.

FIG. 10 is a schematic diagram illustrating an internal structure of a library apparatus in the second embodiment.

A library apparatus 50 in the second embodiment is one example of the second library apparatus according to the present invention.

As illustrated in FIG. 10, the library apparatus 50 has an external shape similar to that of the library apparatus 10 illustrated in FIG. 1, and includes a housing 11 similar to that of the library apparatus 10 and a record medium in-and-out opening 12 through which a magnetic tape is carried in and out of the housing 11. The record medium in-and-out opening 12 is provided at two places. In each of the record medium in-and-out openings 12, a door 12a that opens outwardly is provided, respectively, to enable carrying in and carrying out of the magnetic tape contained in a magazine 12b to and from the library apparatus 50 by opening the door 12a. The magazine 12b may store a maximum number of 10 cassettes of the cassettes 12c that incorporate a magnetic tape 13 (not illustrated).

Also, similarly to the library apparatus 10 illustrated in FIG. 2, the library apparatus 50 are provided with the record medium in-and-out opening 12 through which the magnetic tape 13 is carried in and out of the library apparatus 50; a record medium storage shelf 14 for storing plural magnetic tapes 13; a magnetic tape drive 15 in which the magnetic tape 13 is loaded and which inputs and outputs information to and from the loaded magnetic tape 13; a robot in operation 51 for transferring an information record medium between the record medium in-and-out opening 12 and the record medium storage shelf 14, and between the record medium storage shelf 14 and the magnetic tape drive 15; rails 31, 32 for guiding the robot in operation 51; a robot on standby 52 which stands by at a predetermined standby position 54 as a reserve of a robot in an operation state; rails 56, 57 for guiding the robot in operation 51; a read unit 18 that is detachably attached to either of the robot in operation 51 and the robot on standby 52, and a controller 20 for controlling operations of the robot in operation 51 and the robot on standby 52.

The robot on standby 52 stands by at the predetermined standby position 54 in a state of receiving the read unit 18 from the robot in operation 51, while the robot in operation 51 is in an operation state.

The robot in operation 51 receives the read unit 18 from the robot on standby 52 at the time of reading the barcode of the magnetic tape at the record medium in-and-out opening 12 and returns the read unit 18 to the robot on standby 52 after reading the barcode.

In this way, the library apparatus 50 of the second embodiment is different from the library apparatus 10 of the first embodiment in that the library apparatus 50 utilizes the presence of the two robots and makes the robot on standby 52 have a function of the read unit storage 19 in the library apparatus 10 of the first embodiment, so that the library apparatus 50 is not provided with a read unit storage separate from the robot. Other points are substantially similar to those of the library apparatus 10 of the first embodiment.

The robot in operation 51 moves on the rails 31, 32 in directions of A, B, C, and D, based on a control signal from the controller 20 and transfers the magnetic tape between the record medium in-and-out opening 12 and the record medium storage shelf 14, and between the record medium storage shelf 14 and the magnetic tape drive 15, similarly to the first library apparatus 10 illustrated in FIG. 2.

With the above-described structure, in the library apparatus 50, the read unit 18 is attached to the robot in operation 51 only at a time when reading a barcode of a magnetic tape at the record medium in-and-out opening 12 (see FIG. 2), whereas the read unit 18 is attached to the robot on standby 52 which stands by at the predetermined standby position 54 at all other times. As such, a duration of time in which the read unit 18 is exposed to a dust is shortened, thereby reducing an error occurrence ratio of reading. Consequently, maintenance cost is reduced while increasing the operability, and thus the library apparatus 50 that is of low-cost and highly reliable is obtained.

Also in the library apparatus 50, since one read unit is shared between the two robots of the robot in operation and the robot on standby, the library apparatus 50 may be obtained at low-cost. Furthermore, since the two robots use one same read unit, it is possible to prevent an accuracy of reading from being lowered due to a difference between individual read units.

Next, passing operation of the read unit will be explained.

FIG. 11 is a diagram illustrating passing operation of the read unit in the library apparatus in the second embodiment.

In the second embodiment, as illustrated in FIG. 11, the robot on standby 52 stands by at the standby position 54 in a posture of attaching the read unit 18 thereunder. On the other hand, the robot in operation 51 receives the read unit 18 from the robot on standby 52 by a passing mechanism (not illustrated) and reads a barcode in the posture of attaching the read unit 18 thereon.

In this way, since the read unit 18 waits along with the robot on standby 52 in a state of being attached under the robot on standby 52, the read unit 18 is covered by the housing of the robot on standby 52, and thus dust settlement to the CCD 18a is reduced.

Also in the library apparatus 50 of the second embodiment, similarly to the library apparatus 10 of the first embodiment illustrated in FIG. 9, a reference barcode label 24 for measuring an attach position of the read unit to the robot is put on the housing 11. When the robot receives the read unit from the read unit storage, the controller 20 (see FIG. 2) moves the robot to the position of the reference barcode label 24 and causes the read unit to read the reference barcode label 24, thereby recognizing an attach position of the read unit with respect to the robot.

The controller 20 stores a result of previous recognition, detects a difference between a result of current recognition and the result of previous recognition and adjusts a read position of the read unit based on the difference.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention has been described in detail, it should be understood that the various changes, substitutions, and alterations could be made hereto without departing from the spirit and scope of the invention.

What is claimed is:

1. A library apparatus comprising:
a housing;
a record medium storage shelf that is disposed in the housing and stores a plurality of information record media;
an input-output device in which the information record medium is loaded and which inputs and outputs information to and from the loaded information record medium;
a robot that transfers the information record medium between the record medium storage shelf and the input-output device; and
a controller that controls operation of the robot, wherein the record medium storage shelf, the input-output device, the robot and the controller are arranged in the housing,
the information record medium includes a barcode for identification,
the library apparatus further comprises:
a read unit that is detachably attached to the robot and reads the barcode of the information record medium; and
a read unit storage that is provided separately from the record medium storage shelf in the housing and stores the read unit detached from the robot, and
the controller controls the robot such that when the controller causes the robot to read the barcode of the information record medium, the controller causes the robot to receive the read unit stored in the read unit storage and after reading the barcode by the read unit, the controller causes the robot to return the read unit to the read unit storage.

2. The library apparatus according to claim 1, wherein the read unit storage comprises a pair of holding members that sandwich and hold the read unit; and a read unit detaching device that changes the pair of holding members to be alternately in either a hold posture in which the pair of holding members sandwich and hold the read unit from both sides or a release posture in which the read unit sandwiched by the pair of holding members is released by moving the pair of holding members in a direction of moving away from each other.

3. The library apparatus according to claim 2, wherein the read unit is a unit that includes an imaging element that optically reads a barcode, and
the holding members comprise a seal member that covers a front face of the imaging element when holding the read unit.

4. The library apparatus according to claim 1, wherein the housing includes a reference mark to measure an attach position of the read unit to the robot, and
the controller recognizes the attach position of the read unit with respect to the robot by causing the read unit to read the reference mark when the robot receives the read unit from the read unit storage.

5. A library apparatus comprising:
a housing;
a record medium storage shelf that is disposed in the housing and stores a plurality of information record media;
an input-output device in which the information record medium is loaded and which inputs and outputs information to and from the loaded information record medium;
a robot in operation that transfers the information record medium between the record medium storage shelf and the input-output device; and
a robot on standby that stands by at a predetermined standby position as a reserve of the robot in operation which is in an operation state, wherein
the record medium storage shelf, the input-output device, the robot in operation, and the robot on standby are arranged in the housing,
the information record medium includes a barcode for identification,
the library apparatus further comprises a read unit which is detachably attached to either one of the robot in operation and the robot on standby and which reads a barcode put on the information record medium,
the robot on standby stands by at the predetermined standby position in a state of receiving the read unit from the robot in operation while the robot in operation is in the operation state, and
the robot in operation receives the read unit directly from the robot on standby when reading the barcode of the information record medium and returns the read unit directly to the robot on standby after reading the barcode.

6. The library apparatus according to claim 5, wherein the housing includes a reference mark to measure an attach position of the read unit to the robot, and
the controller recognizes the attach position of the read unit with respect to the robot in operation by causing the read unit to read the reference mark when the robot in operation receives the read unit from the robot on standby.

* * * * *